March 2, 1965 F. KOHLER 3,171,942
WELDING BY USE OF HIGH FREQUENCY CURRENT
Filed Oct. 31, 1962 2 Sheets-Sheet 1

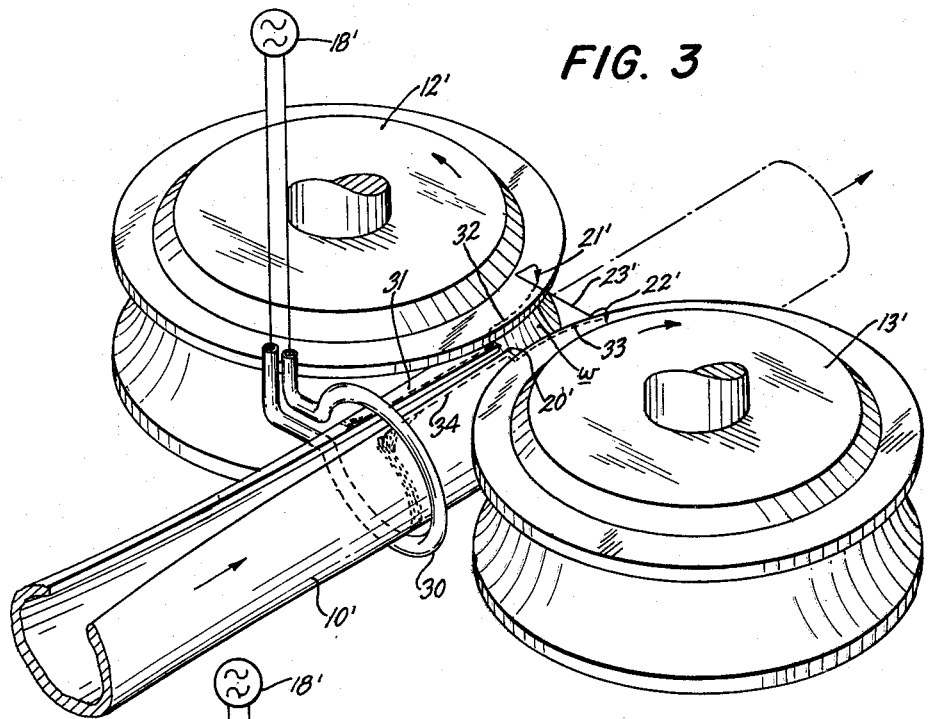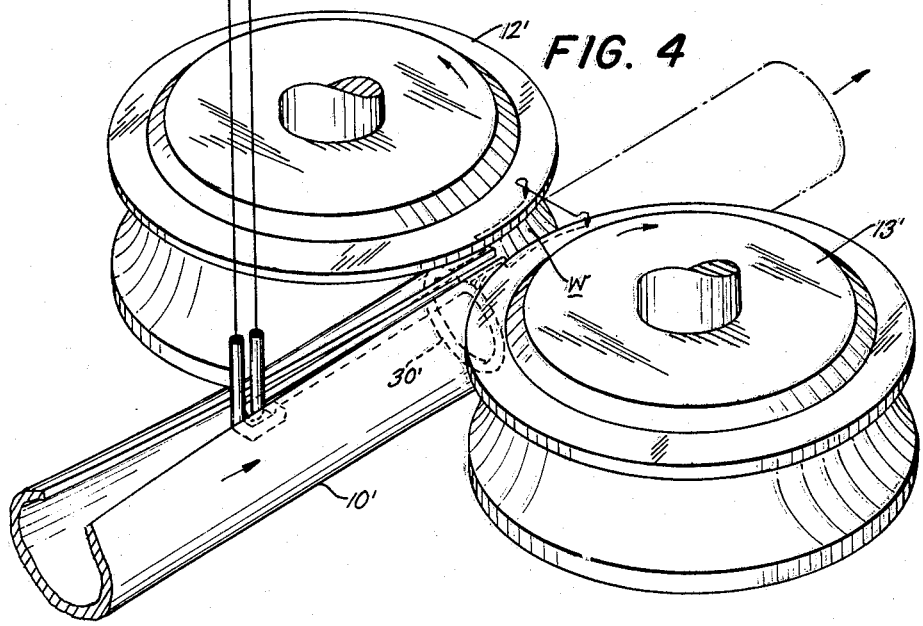

United States Patent Office 3,171,942
Patented Mar. 2, 1965

3,171,942
WELDING BY USE OF HIGH FREQUENCY CURRENT
Fred Kohler, New York, N.Y., assignor to American Machine & Foundry Company, New York, N.Y., a corporation of New Jersey
Filed Oct. 31, 1962, Ser. No. 234,288
5 Claims. (Cl. 219—59)

This invention relates to methods and apparatus for welding metal tubing by the use of high frequency electrical heating currents.

It has become well known to weld a longitudinal seam in metal tubing by the use of high frequency heating current conductively applied by the use of contacts connected with the terminals of a high frequency generator and applied respectively at opposite sides of a V-shaped gap in the metal tubing shortly in advance of a weld point as the tubing is rapidly advanced, or by the use of such current inductively applied through the use of an induction coil located shortly in advance of the weld point. By such methods the heating current flowing in opposite directions at any moment on the opposite edges of the gap in advance of the weld point, becomes concentrated on the surfaces of such edges by reason of mutual inductance, so that substantially only such surfaces are heated up to welding temperature upon reaching the weld point. With such methods, the tube gap is closed at or adjacent the weld point by the use of so-called "squeeze" or pressure rollers engaging the opposite exterior side walls of the tubing.

The present invention relates to improvements or alternative forms of such methods and apparatus, the improvements being such as particularly to adapt same for starting the welding of the seam line, such as on a finite length of tubing, at the very forward end of the workpiece without leaving an interrupted or unwelded seam portion at said forward end and at the same time arrangements are provided for applying the high frequency current to the work without scratching or marring the surface thereof. The invention is particularly well adapted not only for welding ferrous metal but also metals such as copper or aluminum or alloys thereof, or other metals which may become easily scratched or marred by engagement with the contacts, and even though the work is advanced at very high speed, as is desirable for example, in the welding of metal tubing as used for metal cans or the like.

In a co-pending application of Jack Morris, Serial No. 143,205, filed October 5, 1961, now Patent No. 3,133,183, dated May 12, 1964, a method and apparatus is described and claimed wherein the cooperating peripherally grooved pressure rollers for engaging the opposite sides of the tubing at the region of the weld point are utilized as the elements which actually apply the current to the opposite sides of the gap respectively in advance of the weld point. That is, contacts connected respectively to the high frequency current source are mounted to engage the peripheries of such squeeze rolls respectively at positions shortly in advance of the weld point so that the current runs from such contacts along paths almost immediately extending onto the opposed edges of the V-shaped gap in the tubing and thence along on the gap edges to and from the weld point. Thus the contacts slidably engage the periphery of the squeeze rolls in lieu of engaging the workpiece directly. This arrangement is particularly adapted for welding metals which have high thermal conductivity and with which it is desirable so to apply the heating current to enable heating of the edges so rapidly in advance of the weld point that the heat will not have opportunity to become conducted away from the gap edges or cause overheating or softening of the metal other than on the edge surfaces which are to be welded together under pressure with a so-called "forged" type of weld. That is, the fact that the high frequency current contacts are applied to the squeeze rolls instead of directly to the work enables the points of application of the current to be closer than would be possible if the contacts engage the work directly, because in that case the contacts would have to be placed further back from the weld point to afford proper clearance with respect to the squeeze rolls.

The arrangement of the present invention permits taking advantage of either this method of conductively applying the current, or methods for inductively applying the current, while at the same time also affording provision insuring that the current will be applied to the approaching gap edges before the forward ends of such edges actually reach the region of the weld point and while same are still more or less spaced apart. To accomplish this, a bridge connection is applied to interconnect the peripheries of the squeeze rolls at a region preferably close to or just subsequent to the weld point. Accordingly, as the forward ends at the gap of the workpiece approach the weld point, the high frequency current path will be provided from the source of current to the contacts respectively which engage the peripheries of the squeeze rolls (or the current may be inductively applied to the tubing), thence the current will pass to and along the edges which are to be welded, but which are still spaced apart, the paths continuing thence back to the peripheries of the squeeze rolls respectively and across the bridge connection therebetween. Due to the highly effective mutual inductance effect between the current on opposite sides of the gap edges with this arrangement, the edges will start to be heated and will reach almost welding temperature at the forward ends of the workpiece before the edges actually come into contact at the weld point. Thereafter the current will be conducted directly across from one edge to be welded to the other at the weld point, instead of passing over the bridge connection subsequent to the weld point.

Various further and more specific objects, features and advantages of the invention will appear from the description given below, taken in connection with the accompanying drawings, illustrating preferred forms of the invention.

In the drawings:

FIGS. 3 and 4 are views corresponding to FIG. 1, but showing alternative embodiments of the invention.

Figure 1:
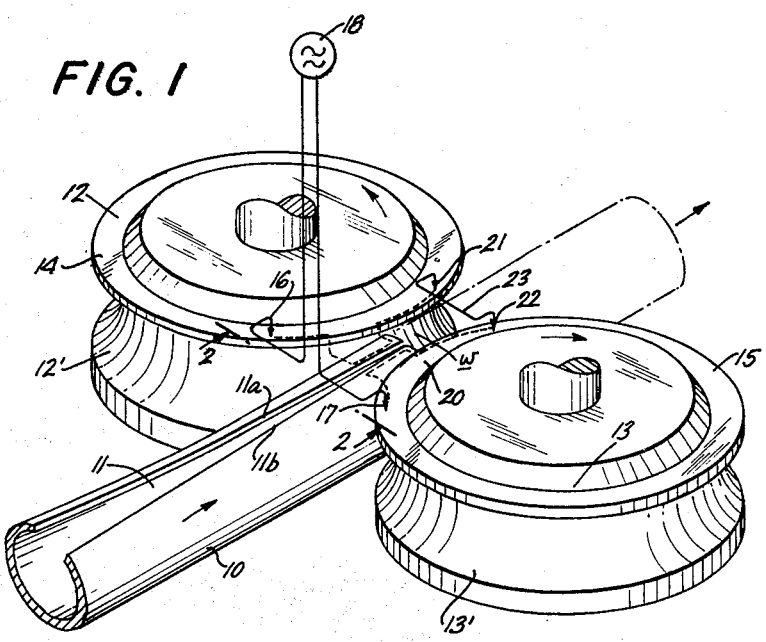
FIG. 1 is a somewhat schematic perspective view of a preferred embodiment of the apparatus for carrying out the invention.
Figure 2:
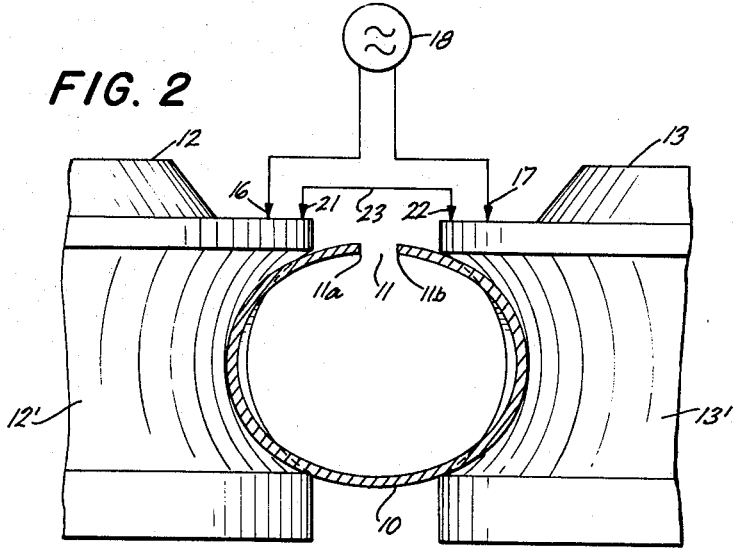
FIG. 2 is a vertical sectional view taken substantially along line 2—2 of FIG. 1.

Referring now to FIGS. 1 and 2 in further detail, a strip of sheet metal or skelp is indicated at 10, as same is being formed into tubing with a V-shaped gap as at 11, and while being advanced between a pair of pressure rollers as at 12 and 13, past a point of welding at $w$. The skelp 10 may, of course, be shaped by suitable known arrangements of rollers, into generally tubular form prior to its reaching the apparatus shown in FIG. 1.

The pressure rollers 12, 13 are preferably formed on their peripheries with grooves as at 12', 13', such that the groove surfaces will conform to a circle when the rollers are viewed in vertical section and with the plane of the section extending radially from the axis of the roller. The upper peripheral portions of the rollers are preferably formed with annular, flat-surfaced flanges as at 14, 15, against which respectively two contacts 16, 17 engage, as shown. These contacts are here shown schematically, but it will be understood that same are arranged resiliently to engage the roll flanges and that same should be of a fluid-cooled type, as is customary for such high frequency apparatus, and these contacts respectively are connected to the terminals of a high frequency generator, as indicated at 18. The current frequency used is preferably in the range of several hundred thousand cycles per second, for example 350 to 450 kilocycles, although in some cases lower frequencies of about 50,000 cycles or higher might be employed.

The amount of high frequency power required, and the preferred speed of movement of the advancing tubing, may be readily determined by trial and in general accordance with the practice heretofore followed in the prior known method hereinabove referred to, wherein high frequency heating current is conductively applied for welding the tubing. The rollers 12, 13 may be suitably driven or if desired act as idler rollers if the tubing is being pulled through the apparatus by other means of known form, not shown.

The apparatus as shown in FIGS. 1 and 2 as thus far described, may be the same or similar to that of the above-mentioned co-pending application of Jack Morris and reference thereto may be had for a further understanding of the detailed features of the construction thereof. However, as shown in FIG. 1, the advancing tube portion 10 is one of finite length and in the particular position as here shown. The forward end thereof 20 is shown just prior to its reaching the weld point $w$ and with the gap edges at the advancing end 20 thereof still spaced apart.

Shortly subsequent to the weld point, a pair of contacts as at 21, 22 are provided resiliently to engage the roll flanges 14 and 15 respectively, these contacts being interconnected by a bridging connection 23. It will be understood that these contacts, as well as the bridging connection are here also shown schematically, but in practice same should be of the fluid-cooled type and mounted by any suitable insulation supporting means so as resiliently to engage and connect the roller flanges at points opposite or shortly subsequent to the weld point to provide a current path until such time as the advancing edge of the workpiece reaches the weld point and its gap becomes closed. Prior to that moment, the high frequency current from the source 18 will follow a path starting for example from the contact 16, thence, as shown by the dotted lines, for a short distance along on the roller 12, then onto the gap edge portion 11a of the workpiece and along on such edge to the forward end of the workpiece, thence back onto the roller 12 to the contacts 21 and 22 as interconnected by the bridge 23, thence back along on roller 13 to the forward end of the edge 11b of the workpiece and along that edge for some distance, thence back to roller 13 and to the contact 17. During this period, while the gap in the workpiece is still open, it will be understood that due to the inductive effect between the currents flowing on the opposite branches of the current path in opposite directions at any one moment, such currents will, due to mutual inductance, tend strongly to attract each other and to follow the paths of least impedance. For this reason, the path of the current starting from contact 16 will promptly go over to the edge 11a of the gap and since the gap is still open, the current will find its path of least impedance by following said gap edges thence along on the peripheries of the rollers as interconnected by the contacts 21, 22 and the bridge 23. Thus, at an appropriate moment as the forward end of the tube 10 passes the region of the contacts 16, 17 into engagement with the grooved peripheries of the rollers, the current will start to flow on the approaching gap edges for starting and continuing the heating of such edges so that when they are no longer spaced apart but come into contact at or adjacent the weld point, they will have been heated to a sufficient temperature whereby the welded seam will start at the very forward end of the tubing or substantially at that point. When the gap edges do thus come into contact, then the contacts 21, 22 and the interconnecting bridge 23 will, of course, become short-circuited and the apparatus will continue to operate in a manner as that disclosed in the above-mentioned co-pending Morris application.

Later, when the trailing end of the tube 10 passes the transverse plane of the contacts 16 and 17, the current path through these contacts and along the peripheries of the rollers will nevertheless continue to provide for a flow of heating current along the trailing end portions of the gap edges for heating same as desired up to the very moment when the trailing end edges become welded. Thus, the welded seam may not only be made to extend from the very forward end of a piece of tubing of finite length, but also to the trailing end or substantially the trailing end thereof. The latter of course, would not be possible if the contacts such as at 16 and 17 were placed instead in direct contact with the gap edges of the workpiece, because as the trailing end of the workpiece comes close to the weld point, there would not be clearance space sufficient to provide for positioning the contacts there, and in any event, the circuit, if the contacts were applied directly to the workpiece, would be interrupted shortly before such end reached the weld point and thus discontinue the welding heat.

The embodiments of FIGS. 3 and 4 are like that of FIGS. 1 and 2, except that the high frequency current is applied inductively to the workpiece instead of being conductively applied to the rollers as in FIG. 1. In FIG. 3, the current is applied by the use of an induction coil as at 30 (which may have one or more turns) and which encircles the workpiece, as shown, shortly in advance of the region of the pressure rollers 12′, 13′, this coil being connected to a source of high frequency current as at 18′, which may have a frequency in the ranges hereinabove mentioned, or in some cases a lower frequency down for example to 10,000 cycles per second. With this arrangement a high frequency current will be induced to flow along a path circumferentially around on the surface of the tubing, as indicated by the dotted lines. When the length of tubing 10′ is in a position with its forward end 20′ located in advance of the weld point $w$ and with the gap still open, the current path, after flowing around the underside of the tubing, will continue as indicated by the dotted line portion 31 along one of the edges of the gap to the forward end of such edge; thence over and along, as indicated at 32, on the periphery of the roller 12′ to the contacts 21′, 22′ as connected by the bridging connection 23′; thence along on the periphery of the other roller 13′, as indicated at 33; thence as indicated at 34 back along from the forward end of the other of the gap edges to its path portion encircling the tubing.

The embodiment of FIG. 4 is like that of FIG. 3, except that here the induction heating coil 30′ is located internally of the advancing tubing, as disclosed in my co-pending U.S. application Serial No. 224,128, filed September 17, 1962, and with this form, as explained in that application, the coil may be placed relatively closer to the weld point without interfering, for lack of clearance space, with the pressure rollers and thus this form is well adapted for cases where the gap edges should be heated quickly and at a very rapid rate. The current path will be like that of FIG. 4, except that in passing circumferentially around the tubing at the coil 30′, the current will largely flow on the interior surface of the tubing.

While the invention has been disclosed with pressure rollers and parts so shaped and positioned as to produce a longitudinal butt weld, it will be understood that arrangements may be made for so advancing and shaping the tubing and positioning its gap edges, as to provide for lap welding of the edges, if desired, and, if desired, for the forming of a so-called mashed lap weld, roller arrangements and means for suitably positioning the advancing workpiece for that purpose being disclosed in U.S. Patent 2,886,691, granted May 12, 1959, and in the co-pending Kohler et al. application Serial No. 171,936, filed February 8, 1962 and entitled "High Frequency Welding of Metal Elements of Finite Length," now Patent No. 3,131,285, date April 28, 1964, these being mentioned as showing the examples of such possibilities.

Although certain particular embodiments of the invention are herein disclosed for purposes of explanation, modifications thereof, after study of this specification, may be apparent to those skilled in the art to which the invention pertains. Reference should accordingly be had to the appended claims in determining the scope of the invention.

What is claimed and desired to be secured by Letters Patent is:

1. Apparatus for welding together the edges of a longitudinally extending V-shaped gap in metal tubing as the tubing is advanced longitudinally past a point of welding at the apex of such gap, to produce a welded seam extending from a point substantially at the forward end of a length of tubing, which apparatus comprises in combination: cooperating pressure rollers for engaging opposite sides of the tubing at the region of said point for causing the closing of such gap at or adjacent said point; means for applying current from the terminals of a high frequency source thereof respectively to opposite edges of said gap respectively at points substantially in advance of said welding point and an interconnected pair of contacts respectively mounted to engage said rollers at points in the region closely adjacent or subsequent to said point of welding, thereby to provide for a flow of heating current on said gap edges prior to their reaching the welding point, along a path extending along one edge surface of said gap to the forward end of said edge thence over to the periphery of one of said rollers and along such periphery to said interconnected contacts and to the periphery of the other of said rollers and back therealong, thence to the forward end of the other edge of said gap and back along such other edge.

2. Apparatus for welding together the edges of a longitudinally extending narrow V-shaped gap in metal tubing of finite length as the tubing is advanced longitudinally past a point of welding at the apex of such gap, to produce a welded seam extending from a point substantially at the forward end of the length of tubing; which apparatus comprises in combination: cooperating peripherally grooved pressure rollers for engaging opposite sides of the tubing at and adjacent the region of said point and for causing the closing of such gap at or adjacent said point; first and second contacts connected respectively to the terminals of a source of current of a frequency of 50,000 cycles per second or higher, said contacts being mounted respectively to engage peripheral portions of such rollers at points substantially in advance of said point of welding, third and fourth contacts mounted respectively to engage peripheral portions of said rollers at points in the region closely adjacent or subsequent to said point of welding and bridge means for interconnecting said third and fourth contacts, thereby to provide a path for a flow of heating current on said gap edges prior to the time when their forward ends reach the welding point and come into contact, such path extending from said first contact onto the periphery of one of said rollers, thence to the tube metal at a point in advance of the point of welding, thence along one edge surface of said gap to the forward end of said edge, thence back to the periphery of said one of said rollers and further along such periphery and to the said third and fourth contacts over the bridge connection therebetween, thence back along on the periphery of the other roller to the forward end of the length of tubing and back along the other edge surface of said gap and again to the periphery of said other of said rollers and to said second contact.

3. Apparatus in accordance with the foregoing claim 1, and in which said means for applying current comprises contacts respectively connected to the terminals of the high frequency current source and mounted respectively to engage said rollers at points substantially in advance of the point of welding.

4. Apparatus in accordance with the foregoing claim 1, in which said means for applying current comprises an induction heating coil mounted to surround the tubing at a region in advance of said rollers and connected to said high frequency current source.

5. Apparatus in accordance with the foregoing claim 1, and in which said means for applying current comprises an induction heating coil mounted to extend circumferentially around the space within the tubing and at a region in advance of the weld point.

References Cited by the Examiner

UNITED STATES PATENTS

| 2,066,668 | 1/37 | Burnett | 219—50 |
| 2,086,305 | 7/37 | Session | 219—8.5 |
| 2,763,756 | 9/56 | Rudd et al. | 219—8.5 |
| 2,774,857 | 12/56 | Rudd et al. | 219—67 |

RICHARD M. WOOD, *Primary Examiner.*